United States Patent Office 3,396,161
Patented Aug. 6, 1968

3,396,161
PROCESS FOR THE MANUFACTURE OF 6α,9α-DI-FLUORO-1,4-PREGNADIENE-3,20-DIONES
Klaus Irmscher, Darmstadt, Karl-Heinz Bork, Darmstadt-Arheilgen, and Hans-Günther Kraft, Darmstadt, Germany, assignors to E. Merck AG., Darmstadt, Germany
No Drawing. Filed Mar. 22, 1966, Ser. No. 536,290
Claims priority, application Germany, Mar. 23, 1965, M 64,612
3 Claims. (Cl. 260—239.55)

ABSTRACT OF THE DISCLOSURE

In a process for the production of anti-phlogistic compounds selected from the group consisting of 6α,9α-difluoro-16-methylene-1,4-pregnadiene - 11β, 17α-diol-3,20-dione and 6α,9α - difluoro-16-methylene-1,4-pregnadiene-17α-ol-3,11,20-trione by the treatment of 6α-fluoro-16-methyl-4,16-pregnadiene-3,20-dione in conventional reaction steps, which treatment comprises:

(a) Epoxidation of the 16,17-double bond,
(b) Cleavage of resultant 16α,17α-oxide groups whereby to form a 17α-hydroxy and a 16-methylene group,
(c) Introduction of a hydroxy group at the 11-position,
(d) Introduction of a fluorine atom at the 9α-position, and
(e) Formation of a 1,2-double bond, the improvement comprising: conducting the treatment by performing (c) as the first step; performing (e) before (a) in the further course of the reaction; and introducing a double bond at the 9(11)-position after performing step (c) but before step (e).

---

The present invention relates in general to a process for the production of difluoro steroids, and more particularly to the production of 6α-9α-difluoro-16-methylene-1,4-pregnadiene-11β,17α-diol-3,20-dione and 6α,9α-difluoro-16-methylene-1,4-pregnadiene-17α-ol-3,11,20 - trione from 6α-fluoro-16-methyl-4,6-pregnadiene-3,20-dione.

These difluoro steroids as well as 6α,9α-difluoro-16-methylene-prednisolone and 6α,9α-difluoro-16-methylene-prednisone and the esters thereof are effective antiphlogistic agents which are particularly suitable for use in dematology.

In the manufacture of these difluoro steroids by conventional methods, a large number of process steps are required and the yield of product is unsatisfactory. For example, in the manufacture of 6α,9α-difluoro-16-methylene-1,4-pregnadiene-11β,17α-diol-3,20-dione and its 11-keto derivative according to German Patent No. 1,140,574, the partial epoxidation of the double bond in the 16-position of 6α-fluoro-16-methyl-4,16-pregnadiene - 3,20-dione results in relatively low yields. Economically attractive yields are not realized with any of the conventional epoxidation agents such as the peracids, alkaline hydrogen peroxide or tert. butyl hydroperoxide.

To increase the yield of intermediate product from the epoxidation of the double bond in the 16-position, it has been proposed to form the 1-dehydro derivative of the starting material, i.e., 6α-fluoro-16-methyl-1,4,16-pregnatriene-3,20-dione. However, satisfactory yields of the ultimate products are not realized even when the 1-dehydro derivative is epoxidized because the subsequent hydroxylation of position 11 is effected only with unsatisfactory yields.

It is therefore a principal object of this invention to provide an improved process for the production of 6α,9α-difluoro-16-methylene-1,4-pregnadiene - 11β,17α - diol-3,20-dione or the corresponding - 17α - ol - 3,11,20-trione from 6α-fluoro-16-methylene-1,4-pregnadiene - 11β,17α-diol-3,20-dione. These compounds, in their turn, may be used in the preparation of 6α,9α-difluoro-prednisone and -prednisolene, only conventional reaction steps being necessary for such a conversion, particularly a 21-acetoxylation.

These and other objects and advantages will become apparent by reference to the following description and claims appended hereto.

It has now been discovered that in the manufacture of 6α,9α - difluoro-16-methylene-1,4-pregnadiene - 11β,17α-diol-3,20-dione or the corresponding - 17α - ol - 3,11,20-trione from 6α-fluoro-16-methyl-4,16-pregnadiene - 3,20-dione by the conventional steps of:

(a) Epoxidation of the double bond of the 16 position,
(b) Cleavage of resultant 16α,17α-oxido group with the formation of a 16-methylene group,
(c) Microbiological introduction of a hydroxyl group in the 11-position,
(d) Introduction of a fluorine atom in the 9α-position, and
(e) Formation of a double bond at the 1-position, unexpectedly high yields of product are obtained by performing step (c) as the first reaction step and by carrying out step (a) after the performance of step (e).

Thus, the invention resides in this special sequence of reactions, the individual reaction steps as such being well known in the art.

The introduction of the 11-hydroxy group to 6α-fluoro-16-methyl-4,16-pregnadiene-3,20-dione, i.e. even before the epoxidation of the 16-double bond and the subsequent splitting off of the 16α,17α-oxido steroid with formation of 16-methylene group, is effected, surprisingly with a yield of over 80%.

Using the known sequence of reactions, only yields of not more than 30% are obtained. It is well known that such low yields have the further disadvantage that great difficulties are involved in the separation and isolation of the desired final product. The separation from the by-products is only possible by lengthy chromatographic operations.

It has also been found that the yield from the partial epoxidation of the 16,17-double bond of 3-keto-4,16-diene steroids can be considerably increased if the epoxidation is performed on the corresponding compound, unsaturated in the 1-position instead of the compound saturated in the 1-position which is the usual way. It is particularly advantageous to conduct the epoxidation reaction on 6α-fluoro-16-methyl-1,4,16-pregnatriene-11-ol-3,20 - dione or on 6α-fluoro-16-methyl-1,4,9(11),16-pregnatetraene-3,20-dione.

The reaction conditions utilized in the individual reaction steps of the present invention are adequately described in the literature.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. All percentages set forth in the following examples are weight percentages.

EXAMPLE 1

(a) 11-hydroxylation 50 l. of a nutrient solution comprising 0.1% cornsteep, 0.1% soya flour, 1% glucose, 0.1% yeast, 0.1% $KH_2PO_4$, 0.025% magnesium sulphate and 0.15% sodium nitrate is inoculated with 5 l. of a culture of metarhizium anisopliae and the resultant mixture is incubated at about 28° C. with good aeration. After 20 hours' growth, a solution of 15 g. active ingredient of 6α-fluoro-16-methyl-4,16-pregnadiene-3,20-dione dissolved in 600 ml. methanol is added thereto. Four hours later a second portion of 15 g. active ingredient in 600 ml. methanol is added. The resultant solution is allowed to stand about 20 hours after the first addition of active ingredient whereupon it is cooled, the fermentation broth then being extracted several times with methylene chloride. On concentration to about 1 l., 21.2 g. of 6α-fluoro-16-methyl-4,16-pregnadiene-11α-ol-3,20-dione is precipitated having an M.P. of 259–261° C.; on further concentration, another 6.4 g. are obtained with an M.P. of 254–260° C. A sample of the first crystallizate melts after recrystallization from chloroform at 260–262° C.;

$\lambda_{max}$ 239 mμ; $E^{1\%}_{1cm.}$ 583; $(\alpha)_D + 68.30°$ (chloroform)

(b) 1-dehydrogenation (b₁) A mixture of 10 g. 6α-fluoro-16-methylene-4,16-pregnadiene-11α-ol-3,20-dione, 9.4 g. 2,3-dichloro-5,6-dicyanoquinone and 300 ml. dioxan are refluxed for 15 hours. On cooling, the precipitated dichlorodicyanohydroquinone is filtered off and the filtrate washed with caustic soda solution, water, dilute hydrochloric acid and again with water, dried and concentrated. The residue obtained is recrystallized from methanol. There is obtained a yield of 8.22 g. of 6α-fluoro-16-methyl-1,4,16-pregnatriene-11α-ol-3,20-dione; M.P. 301–303° (decomposition);

$\lambda_{max}$ 247 mμ; $E^{1\%}_{1cm.}$ 780

(b₂) 5 l. of a nutrient solution comprising 0.1% Basamin Bush and 0.1% peptone are inoculated with 500 ml. of a culture of corynebacterium simplex in a fermentation vessel and aerated for 12 hours at about 28° C. 2 g. of 6α-fluoro - 16-methyl-4,16-pregnadiene-11α-ol - 3,20-dione in 200 ml. methanol are then added. After 48 hours the fermentation broth is extracted several times with methylene chloride. By concentration of the extract there is obtained 1.62 g. of 6α-fluoro-16-methyl-1,4,16-pregnatriene-11α-ol-3,20-dione with an M.P. of 301–303° C.

(c) Epoxidation of 16-position double bond 2 g. 6α-fluoro-16-methyl-1,4,16-pregnatriene - 11α - ol-3,20-dione are dissolved in 200 ml. chloroform. After the addition of 1.5 g. monoperphthalic acid, the mixture is allowed to stand for 48 hours at room temperature. The precipitated phthalic acid is then filtered off, the filtrate is washed with ferrous sulphate solution and water, dried and concentrated. After the addition of methanol 1.8 g. of 6α-fluoro-16β-methyl-16α,17α-oxido - 1,4 - pregnadiene-11α-ol-3,20-dione are crystallized; M.P. 269–270° C.;

$\lambda_{max}$ 244 mμ; $E^{1\%}_{1cm.}$ 538; $(\alpha)_D + 47°$ (chloroform)

(d) Splitting of the epoxide

After 107 mg. HCl in the form of a hydrogen chloride-saturated ethyl acetate solution is added to a solution of 2.2 g. 6α - fluoro-16β-methyl-16α,17α-oxido-1,4-pregnadiene-11α-ol-3,20-dione in 25 ml. chloroform and 220 ml. ethyl acetate, the mixture is refluxed for 5 hours. The mixture is then concentrated and the resulting crystals of 6α-fluoro - 16-methylene-1,4-pregnadiene-11α,17α-diol-3,20-dione are filtered off. Yield: 1.93 g.; M.P. 263–267° C. from chloroform/methanol; $(\alpha)_D - 54°$ (dioxan);

$\lambda_{max}$ 244.5 mμ; $E^{1\%}_{1cm.}$ 525

(e) Dehydration

A solution of 5 g. p-toluene-sulfonic acid-chloride in 18 ml. pyridine is added to a solution of 5 g. 6α-fluoro-16-methylene-1,4-pregnadiene-11α,17α-diol-3,20-dione in 18 ml. pyridine. After standing at room temperature for a period of 18 hours, the solution is poured into 400 ml. of ice water containing 42 ml. of 37% hydrochloric acid; the suspension obtained being extracted with chloroform. The extracts are then evaporated to dryness. The yellow resin obtained is dissolved in 63 ml. glacial acetic acid and after the addition of 7.5 g. sodium acetate, the solution is refluxed for 30 minutes. The reaction mixture is poured into 600 ml. water and the precipitated 6α-fluoro-16-methylene - 1,4,9(11) - pregnatriene-17α-ol-3,20-dione is filtered off. Yield: 4.35 g.

(f) Preparation of the 9β,11β-epoxide

A solution of 4.35 g. 6α-fluoro-16-methylene-1,4,9(11)-pregnatriene-17α-ol-3,20-dione, 0.44 g. p-toluene-sulfonic acid, 87 ml. glacial acetic acid and 8.7 ml. acetic acid anhydride is diluted with 1 l. water after standing at room temperature for 18 hours. The precipitate is filtered off, thoroughly washed with water and dried (yield: 4.55 g.). The raw material is dissolved in 145 ml. acetone and treated with 3.18 g. N-bromo-succinimide, 28 ml. water and 1 ml. 70% perchloric acid. After standing for 6 hours, it is diluted with water, and the resultant precipitate is filtered off. The dried raw material (5.4 g.) together with 12 g. potassium acetate in 250 ml. ethanol are refluxed for two hours. The reaction mixture is then diluted with water and the suspension extracted with chloroform. The residue of the extracts (4.4 g.) is dissolved in 110 ml. methanol with heating. On addition of 16 ml. 1 N-caustic soda the solution is boiled for 15 minutes in an atmosphere of nitrogen. The solution is concentrated to about 20 ml. by weight per hour under reduced pressure and then diluted with 50 ml. water. 3.5 g. 6α-fluoro-9β,11β-oxido-16-methylene-1,4-pregnadiene-17α-ol-3,20-dione are obtained.

(g) Splitting off with hydrogen fluoride

A solution of 3.05 g. 6α-fluoro-9β,11β-oxido-16-methylene-1,4-pregnadiene-17α-ol-3,20-dione in 18 ml. chloroform, cooled to −60° C., is added to a mixture of 4.95 g. hydrogen fluoride, 7 g. tetra-hydrofuran and 3.75 g. chloroform, which is also cooled to −60° C. The reaction mixture is warmed to 0°, retained at this temperature for 4 hours, and then added to an aqueous solution of sodium bicarbonate. The organic layer is separated, washed thoroughly with water, dried and evaporated to dryness. On triturating the residue with acetone, 1.95 g. of 6α,9α-difluoro-16-methylene-1,4-pregnadiene-11β,17α-diol-3,20-dione are crystallized.

(h) Oxidation 0.5 ml. of an 8 N solution of chromic acid anhydride in sulphuric acid is added dropwise with stirring at a temperature of +5° C. to a solution of 0.6 g. 6α,9α-difluoro - 16 - methylene - 1,4 - pregnadiene - 11β,17α-diol-3,20-dione in 15 ml. acetone. Five minutes after this addition has been concluded, the solution is diluted with 100 ml. water and the 6α,9α-difluoro-16-methylene-1,4-pregnadiene-17α-ol-3,11,20-trione filtered off. Yield: 0.56 g.

EXAMPLE 2

(a) 11-hydroxylation 5.l. of a nutrient solution comprising 1% sucrose, 0.25% malt extract, 0.2% cornsteep, 0.2% sodium nitrate, 0.1% $KH_2PO_4$, 0.1% $(NH_4)_2HPO_4$, 0.05% magnesium sulphate and 0.01% ferrous sulphate are inoculated with 700 ml. of a culture of curvularia lunata in a fermenting vessel, and incubated, first with moderate and then stronger aeration at a temperature of 28° C. After 24 hours growth, 5 g. of 6α-fluoro-16-methyl-4,16-pregnadiene-3,20-dione in 200 ml. methanol is added thereto. The reaction, which is monitored by thin layer chromatography is complete after about 26 hours. The fermentation broth is then cooled and extracted several times with methylene chloride. 3.7 g. 6α-fluoro-16-methyl-4,16-pregnadiene-11β-ol-3,20-dione, M.P. 219–244° C., separates from the combined extracts which have been concentrated to about 200 ml. By precipitation of the mother liquor with petroleum ether another 0.55 g. are obtained having a M.P. of 215–220°° C. A sample of the first crystallizate melts on recrystallization from chloroform/methanol at 222–224° C.

(b) Dehydration 2.5 ml. of methane sulfonic acid chloride is added dropwise with stirring to the suspension of 5.3 g. 6α-fluoro-16 - methyl-4,16-pregnadiene-11β-ol-3,20-dione prepared according to Example 2 (a) in 25 ml. dimethylformamide and 4 ml. pyridine. The reaction mixture is then heated for 1 hour to a temperature of 90° C., 120 ml. methanol added after cooling, cooled further with ice and the crystals of 6α-fluoro-16-methyl-4,9(11),16-pregnatriene-3,20-dione filtered off. Yield: 4.62 g.

(c) 1-dehydrogenation ($c_1$) 1 g. of the 6α-fluoro-16-methyl-4,9(11),16-pregnatriene-3,20-dione obtained according to Example 2(b) is mixed with 0.91 g. dichlorodicyanoquinone in 30 ml. dioxan. The resultant mixture is then refluxed for 10 hours and worked up as in Example 1 ($b_1$). Yield of 6α-fluoro-16-mehtyl-1,4,9(11),16-pregnatetraene-3,20-dione: 0.73 g.

($c_2$) 1.5 g. 6α-fluoro-16-methyl-4,9(11),16-pregnatriene-3,20-dione are refluxed together with 400 mg. selenium dioxide in 80 ml. tert.-butanol and 0.5 ml. glacial acetic acid for 24 hours. Then a further 400 mg. of selenium dioxide are added and the reaction mixture heated for another 24 hours. On cooling, the precipitated selenium is filtered off and the filtrate concentrated by evaporation under reduced pressure. The solution of the residue in chloroform is washed consecutively with sodium bicarbonate solution, water, ammonium sulphide solution, dilute ammonia, water, dilute hydrochloric acid and water. 0.81 g. of 6α-fluoro-16-methyl-1,4,9(11),16-pregnatetraene-3,-20-dione are obtained through evaporation of the dried chloroform solution.

($c_3$) 5 l. of nutrient solution of the composition described in Example 1($b_2$) are inoculated with corynebacterium simplex and aerated. As in Example 1($b_2$), 2 g. 6α-fluoro-4,9(11),16-pregnatriene-3,20-dione are fermented and worked up. Yield of 6α-fluoro-16-methyl-1,4,9(11),16-pregnatetraene-3,20-dione: 1.67 g.

(d) Partial epoxidation 0.88 g. 6α-fluoro-16-methyl-1,4,9(11),16-pregnatetraene-3,20-dione are dissolved in 150 ml. methanol, 9 ml. of 30% hydrogen peroxide and a solution of 200 mg. potassium carbonate in 8 ml. water are then added thereto. After standing for 48 hours, the solution is acidified with acetic acid, diluted with water and extracted with methylene chloride. The extracts are washed well with water and then concentrated, whereby 0.62 g. 6α-fluoro-16β - methyl - 16α,17α - oxido - 1,4,9(11) - pregnatriene-3,20-dione crystallizes.

(e) Splitting of the epoxide 1.8 g. 6α-fluoro-16β-methyl-16α,17α-oxido-1,4,9(11)-pregnatriene-3,20-dione in 180 ml. ethyl acetate is refluxed for 2 hours after the addition of 100 mg. hydrogen chloride. The solution is then concentrated by evaporation under reduced pressure, whereby 1.51 g. of pure 6α-fluoro - 16 - methylene - 1,4,9(11) - pregnatriene - 17α-ol-3,20-dione are precipitated. The substance is then used in the manufacture of 6α,9α-difluoro-16-methylene-1,4-pregnadiene-11β,17α-diol-3,20-dione according to Examples 1(f) and 1(g) above without any further purification.

EXAMPLE 3

3.7 g. of 6α-fluoro-16-methyl-1,4,16-pregnatriene-11α-ol-3,20-dione prepared according to Example 1($b_1$) or 1($b_2$) are added to 35 ml. pyridine with 3.5 g. p-toluene sulfonic acid chloride. After standing for 20 hours at room temperature, the reaction mixture is added to 400 ml. of an aqueous solution containing 40 ml. of 37% hydrochloric acid. The precipitated 6α-fluoro-16-methyl-1,4,16-pregnatriene-11α-ol-3,20-dione-11-tosylate is then dissolved in chloroform. The residue obtained by evaporation of the extracts which have been washed to neutrality is added to 50 ml. glacial acetic acid with 5 g. sodium acetate and the resultant mixture refluxed for 45 minutes. The resultant mixture is then added to water and there is precipitated 3.0 g. 6α-fluoro-16-methyl-1,4,9(11),16-pregnatetraene-3,20-dione. The substance is then converted to 6α,9α-difluoro-16-methylene-1,4-pregnadiene-11β,17α-diol-3,20-dione according to the procedure in Examples 2(d), 2(e) and 1(f) and 1(g).

EXAMPLE 4

(a) 1-dehydrogenation 2.95 g. of the 6α-fluoro-16-methyl-4,16-pregnadiene-11β-ol-3,20-dione obtained by way of Example 2(a) is dehydrogenated to obtain according to Example 2(c) 6α-fluoro-16-methyl-1,4,16-pregnatriene-11β-ol-3,20-dione. M.P. 251–254° C. Yield: 163 g. (by Example 2($c_1$)) or 1.7 g. (by Example 2($c_3$)).

(b) Dehydration 1 g. of the product obtained by way of Example 4(a) is converted to 6α-fluoro-16-methyl-1,4,9(11),16-pregnatetraene-3,20-dione according to the procedure of Example 2(b). Yield: 0.86 g.

Further reactions to yield the desired product can be carried out according to any one of the above-described procedures.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed:

1. In a process for the production of compounds selected from the group consisting of 6α,9α-difluoro-16-methylene-1,4 - pregnadiene - 11β,17α-diol-3,20-dione and 6α,9α-difluoro - 16-methylene - 1,4-pregnadiene - 17α-ol-3,11,20-trione by the treatment of 6α-fluoro-16-methyl-4,16 - pregnadiene - 3,20 - dione in conventional reaction steps, which treatment comprises:

(a) epoxidation of the 16,17-double bond,
(b) cleavage of resultant 16α,17α-oxido groups whereby to form a 17α-hydroxy and a 16-methylene group,
(c) introduction of a hydroxy group at the 11-position,
(d) introduction of a fluorine atom at the 9α-position, and
(e) formation of a 1,2-double bond, the improvement comprising: conducting the treatment by performing (c) as the first step; performing (e) before (a) in the further course of the reaction; and introducing by dehydration a 9(11)-double bond after performing (c) and before (e).

2. The improved process as defined by claim 1 wherein the epoxidation (a) is conducted on 6α-fluoro-16-methyl-1,4,9(11),16-pregnatetraene-3,20-dione.

3. In a process for the conversion of 6α-fluoro-16-methyl-4,16-pregnadiene - 3,20 - dione to 6α-fluoro-16β- methyl-16α,17α-oxido-1,4,9(11) - pregnatriene-3,20-dione which is suitable for use in the manufacture of difluoro steroids, said conversion comprising epoxidation of the double bond at the 16-position, the improvement which comprises the sequential steps of:
(1) introducing a hydroxy group at the 11-position,
(2) introducing by dehydration a double bond at the 9(11)-position,
(3) forming a double bond at the 1-position, and
(4) epoxidizing the double bond at the 16-position.

References Cited

UNITED STATES PATENTS 2,932,639  4/1960  Oliveto et al. ----- 260—239.55
3,068,224  12/1962  Taub et al. ------ 260—239.55

LEWIS GOTTS, *Primary Examiner.*

T. MESHBESHER, *Assistant Examiner.*